United States Patent
Schartner

(10) Patent No.: US 10,723,356 B2
(45) Date of Patent: Jul. 28, 2020

(54) ELECTRONIC CONTROL UNIT FOR CONTROLLING THE AUTO-HOLD FUNCTION

(71) Applicant: Bayerische Motoren Werke Aktiengesellschaft, Munich (DE)

(72) Inventor: Andreas Schartner, Eching (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 157 days.

(21) Appl. No.: 16/051,569

(22) Filed: Aug. 1, 2018

(65) Prior Publication Data

US 2018/0339707 A1 Nov. 29, 2018

Related U.S. Application Data

(60) Provisional application No. PCT/EP2017/051088, filed on Jan. 19, 2017.

(30) Foreign Application Priority Data

Feb. 3, 2016 (DE) .................. 10 2016 201 664

(51) Int. Cl.
*B60W 30/18* (2012.01)
*F02D 28/00* (2006.01)
(Continued)

(52) U.S. Cl.
CPC ......... *B60W 30/18118* (2013.01); *B60T 7/08* (2013.01); *B60T 7/122* (2013.01); *B60T 2201/06* (2013.01)

(58) Field of Classification Search
CPC ........ B60W 30/18; F02D 28/00; B60T 13/00; B60T 7/12; B60T 13/14; B60T 13/66
See application file for complete search history.

(56) References Cited

U.S. PATENT DOCUMENTS 3,593,815 A * 7/1971 Inoue .................. B60T 7/12
180/271
2001/0023799 A1 9/2001 Engelhard
(Continued)

FOREIGN PATENT DOCUMENTS

DE 100 06 656 C1 6/2001
DE 10 2008 001 842 A1 11/2009
(Continued)

OTHER PUBLICATIONS

International Search Report (PCT/ISA/210) issued in PCT Application No. PCT/EP2017/051088 dated Mar. 23, 2017 with English translation (five pages).

(Continued)

*Primary Examiner* — Yuri Kan
(74) *Attorney, Agent, or Firm* — Crowell & Moring LLP

(57) ABSTRACT

A method and electronic control unit having a functional module are provided for controlling the auto-hold function and the parking brake function in a motor vehicle, by use of a single common operating element. When the parking brake function is switched on at a standstill, the auto-hold function is simultaneously activated. When the accelerator pedal is actuated, a switched-on parking brake function is automatically switched off without the actuation of the operating element, wherein the auto-hold function remains activated. In addition, when switching off the parking brake function at a standstill, the auto-hold function is also deactivated via the actuation of the operating element.

12 Claims, 2 Drawing Sheets

(51) Int. Cl.
*B60T 7/12* (2006.01)
*B60T 7/08* (2006.01)

(56) References Cited

U.S. PATENT DOCUMENTS

| | | | |
|---|---|---|---|
| 2006/0279136 A1* | 12/2006 | Haeussler | B60T 7/107 |
| | | | 303/20 |
| 2011/0039658 A1* | 2/2011 | Sokoll | B60T 7/14 |
| | | | 477/195 |
| 2011/0238284 A1* | 9/2011 | Bollig | B60W 10/18 |
| | | | 701/113 |
| 2013/0162010 A1* | 6/2013 | Koyama | B60T 13/741 |
| | | | 303/6.01 |
| 2016/0339888 A1* | 11/2016 | Yokoyama | F16D 65/18 |

FOREIGN PATENT DOCUMENTS

| | | |
|---|---|---|
| DE | 10 2008 020 844 A1 | 11/2009 |
| DE | 10 2014 200 046 A1 | 7/2015 |
| WO | WO 00/76818 A1 | 12/2000 |

OTHER PUBLICATIONS

German-language Written Opinion (PCT/ISA/237) issued in PCT Application No. PCT/EP2017/051088 dated Mar. 23, 2017 (five pages).

German-language Search Report issued in counterpart German Application No. 10 2016 201 664.4 dated Nov. 16, 2018 with partial English translation (12 pages).

\* cited by examiner

ELECTRONIC CONTROL UNIT FOR CONTROLLING THE AUTO-HOLD FUNCTION

CROSS REFERENCE TO RELATED APPLICATIONS

This application is a continuation of PCT International Application No. PCT/EP2017/051088, filed Jan. 19, 2017, which claims priority under 35 U.S.C. § 119 from German Patent Application No. 10 2016 201 664.4, filed Feb. 3, 2016, the entire disclosures of which are herein expressly incorporated by reference.

BACKGROUND AND SUMMARY OF THE INVENTION

The invention relates to an auto-hold function, i.e. an immobilizing function for temporarily holding an operationally ready motor vehicle in the stationary state by means of an electro-hydraulically, electro-pneumatically or electro-mechanically controlled service brake. Such an immobilizing function is known, for example, from DE 10 2008 020 844 A1.

In order to increase comfort and safety in vehicles, a wide variety of methods and devices are already known which are intended to serve to prevent an operationally ready motor vehicle from rolling away, in particular, but not necessarily, on gradients. In this context, when a brake pedal, or another operator control element which is provided therefor, is actuated in at least one operating state of the motor vehicle, a braking force is maintained or actively increased at at least one wheel of the vehicle. The braking force can also be increased here as a function of the degree of actuation of the pedal or the corresponding actuation of the operator control element. When the brake pedal is not actuated, the braking force is subsequently maintained up to a defined release condition, in particular until the accelerator pedal is actuated.

In addition to these immobilizing brake functions for temporarily holding an operationally ready motor vehicle in the stationary state, electromechanical holding functions are also known which can hold the vehicle, which has generally been parked, permanently in the stationary state. The brake pressure or the braking force (braking torque) for permanently holding the vehicle is maintained here by use of an additional mechanical parking brake device which can be activated by the driver at will by means of his own parking brake operator control element, in particular in the form of an electrical switch which can be actuated manually. An example of such a holding function or device is an electro-mechanical immobilizing brake (EMF) of the Applicant.

A wide variety of different entry conditions and/or triggering conditions are already provided for the activation and deactivation of the service brake within the scope of the abovementioned electrohydraulic, electropneumatic or electromechanical immobilizing brake functions for temporarily holding an operationally ready motor vehicle in the stationary state.

An immobilizing brake function for temporarily holding the vehicle is referred to below as an "auto-hold" function. An immobilizing brake function for permanently holding the vehicle is referred to below as a "parking brake" function.

The Applicant's vehicles include, to a certain extent, both a parking brake function and an auto-hold function. The two functions are currently each assigned to an operator control element for manually switching on and off. With respect to the functional capability of these two functions, reference is made, for example, to the online operating instructions of the BMW 5 Series, year of manufacture 2014 (online version for item number 0140 2 928 052-II/14).

The object of the invention is to reduce the costs for implementing an auto-hold function.

This and other objects are achieved by a method, a vehicle and an electronic control unit having a function module for controlling the auto-hold function and the parking brake function in a motor vehicle. The function module is configured such that it receives an electrical signal of the operator control element for switching the parking brake function on and off as an input signal, wherein when the parking brake function is switched on in the stationary state the auto-hold function is or can be activated simultaneously.

The invention is based on the main concept of implementing both a parking brake function and an auto-hold function with just a single common operator control element.

When the auto-hold function is activated, the vehicle is braked hard as soon as a stationary state of the vehicle is detected, in particular if the speed of the motor vehicle has undershot a predefined speed threshold which is tending toward zero. The activation of the auto-hold function can therefore already take place before stationary state. An activated auto-hold function occurs, as it were, in a standby state during travel and goes into a hard braking state in the stationary state of the vehicle. According to the prior art, until now a separate pushbutton key has been provided for activating or deactivating the auto-hold function. According to the invention, this pushbutton key should be dispensed with, and the activation or deactivation of the auto-hold function should be carried out by an operator control element (in particular a pushbutton key or switch) which is also used to switch the parking brake function on and off.

For this purpose, according to the invention, the operator control element is connected to an electronic control unit by which both the auto-hold function and the parking brake function can be controlled. For this purpose, the control unit is configured in such a way that, when the parking brake function is switched on in the stationary state, the auto-hold function is or can be activated simultaneously.

Furthermore, the control unit is configured in such a way that, when the accelerator pedal is actuated, the parking brake function is switched off automatically without actuation of the operator control element, but the auto-hold function remains activated.

In an alternative embodiment, when the parking brake function is switched on in the stationary state, the auto-hold function is deactivated. When the accelerator pedal is actuated, the parking brake function is switched off out of this state and the auto-hold function is activated.

In one development of the invention, the control unit is configured in such a way that when the parking brake function is switched off in the stationary state, the auto-hold function can also be deactivated by actuating the operator control element.

In a first alternative, the control unit is configured in such a way that when the operator control element is actuated in the stationary state, out of the state of a deactivated auto-hold function and a switched-off parking brake function, in a way which causes the parking brake to switch on in the stationary state (e.g. pulling on a pull/push switch as an operator control element), both functions are activated simultaneously.

In a second alternative, the control unit is configured in such a way that when the operator control element is actuated for the first time in the stationary state, out of the state of a deactivated auto-hold function and a switched-off parking brake function, in the way which causes the parking brake to switch on in the stationary state, firstly only the auto-hold function is activated. Then, when the operator control element is actuated again, the parking brake function is also switched on, wherein the auto-hold function remains activated.

This second alternative applies analogously to the switched-off process and deactivation process with corresponding actuation of the operator control element in a way which causes the parking brake to switch off in the stationary state (e.g. pressing on a pull/push switch as an operator control element).

In a first alternative, the control unit is further configured in such a way that when the operator control element is actuated during travel in a way which causes the parking brake to switch on in the stationary state (e.g. pulling on a pull/push switch as an operator control element), the auto-hold function is activated, in particular when the actuation of the operator control element is performed in a defined, comparatively short time or when no emergency braking function is connected to the actuation of the operator control element during travel.

In a second alternative, the control unit is further configured in such a way that when the operator control element is actuated during travel in a way which causes the parking brake to switch on in the stationary state, the auto-hold function cannot be activated in particular if an emergency brake function (e.g. by means of continuous pulling on a pull/push switch as an operator control element) is connected to the actuation of the operator control element during travel.

In a third alternative, the control unit is further configured in such a way that when the operator control element is actuated during travel in a way which causes the parking brake to switch on in the stationary state, the auto-hold function can be activated if the actuation of the operator control element is performed in a defined, comparatively short time, and that, after the expiry of this time, a further actuation of the operator control element causes an emergency braking function.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
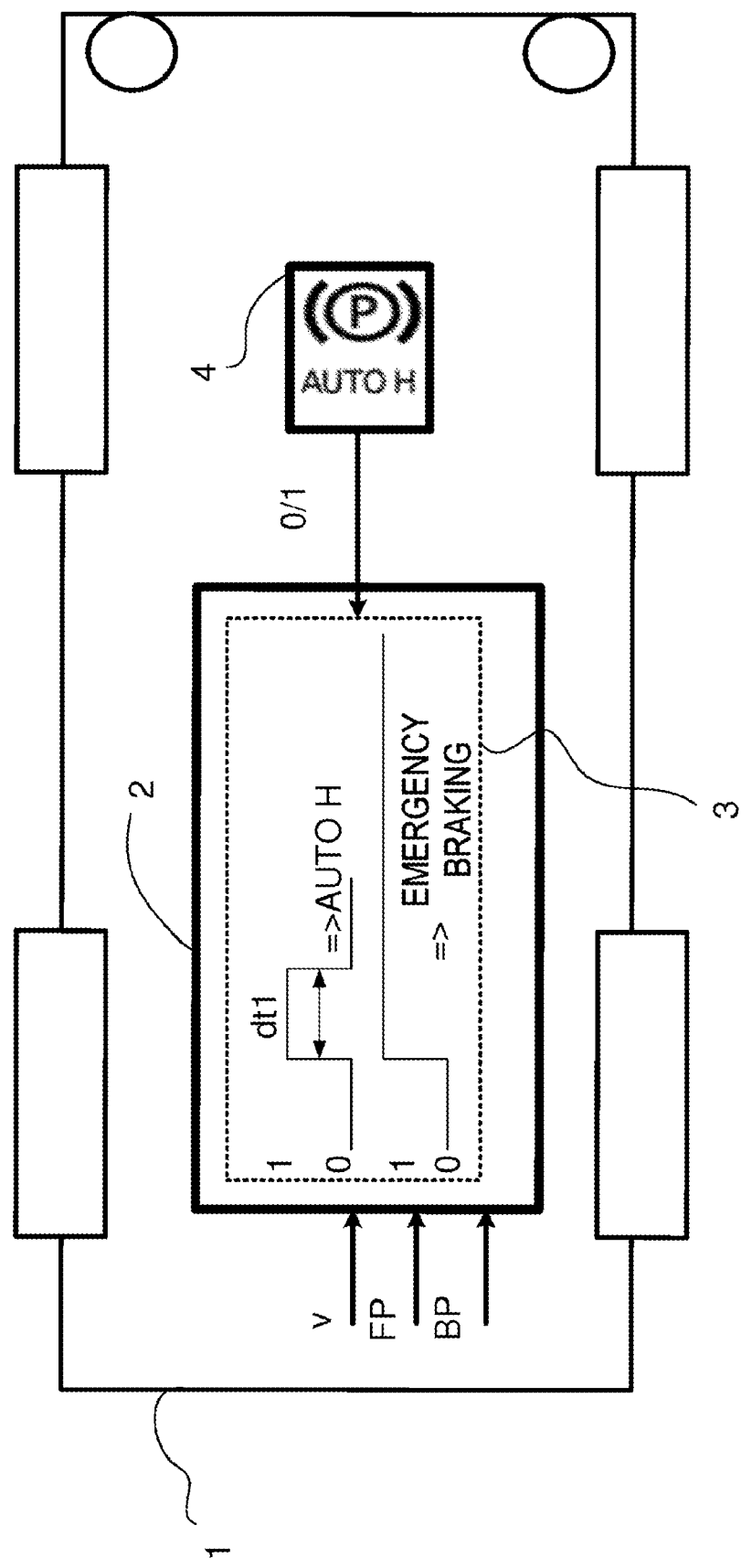
FIG. 1 is a schematic illustration of a motor vehicle having the essential components of the invention.

FIG. 1 illustrates a motor vehicle 1 having an operator control element 4 for switching the parking brake function on and off and having an electronic control unit 2. The electronic control unit 2 has a function module 3, in particular in the form of a software program product, for controlling an auto-hold function and the parking brake function. The function module 3 is programmed in such a way that it receives at least the electrical signals (switch-on signal "1" and switch-off signal "0") of the operator control element 4 for switching the parking brake function on and off and a vehicle speed signal v for detecting a vehicle stationary state as input signals. The actuation signals of the accelerator pedal FP and of the brake pedal BP are also preferably input signals of the control unit 2. The method according to the invention is carried out as a function of at least the vehicle speed v and the actuation signal (0/1) of the operator control element 4.

Both the auto-hold function (AUTO H) and the parking brake function (P) can be controlled by way of the function module 3 in the control unit 2, using the single operator control element 4. In this context, when the parking brake function is switched on in the stationary state (for example when v=0), the auto-hold function is activated at the same time. When the accelerator pedal FP is actuated, the parking brake function is switched off automatically without actuation of the operator control element 4, but the auto-hold function remains activated. When the parking brake function is switched off in the stationary state by actuating the operator control element 4, the auto-hold function is also deactivated.

In one of three possible alternatives, when the operator control element 4 is actuated here during travel (v>0) in a way which causes the parking brake to switch on in the stationary state (e.g. by pulling a pull/push key 4 or switch-on signal "1"), the auto-hold function (AUTO H) is activated if the actuation of the operator control element 4 is performed in a defined, comparatively short time dt1 and ended again, wherein after the expiry of this time dt1 further actuation of the operator control element causes an emergency braking function (EMERGENCY BRAKING).

In particular, this method is also explained below in more detail in a tabular form on the basis of an exemplary embodiment according to FIG. 2 by way of a state diagram.

Figure 2:
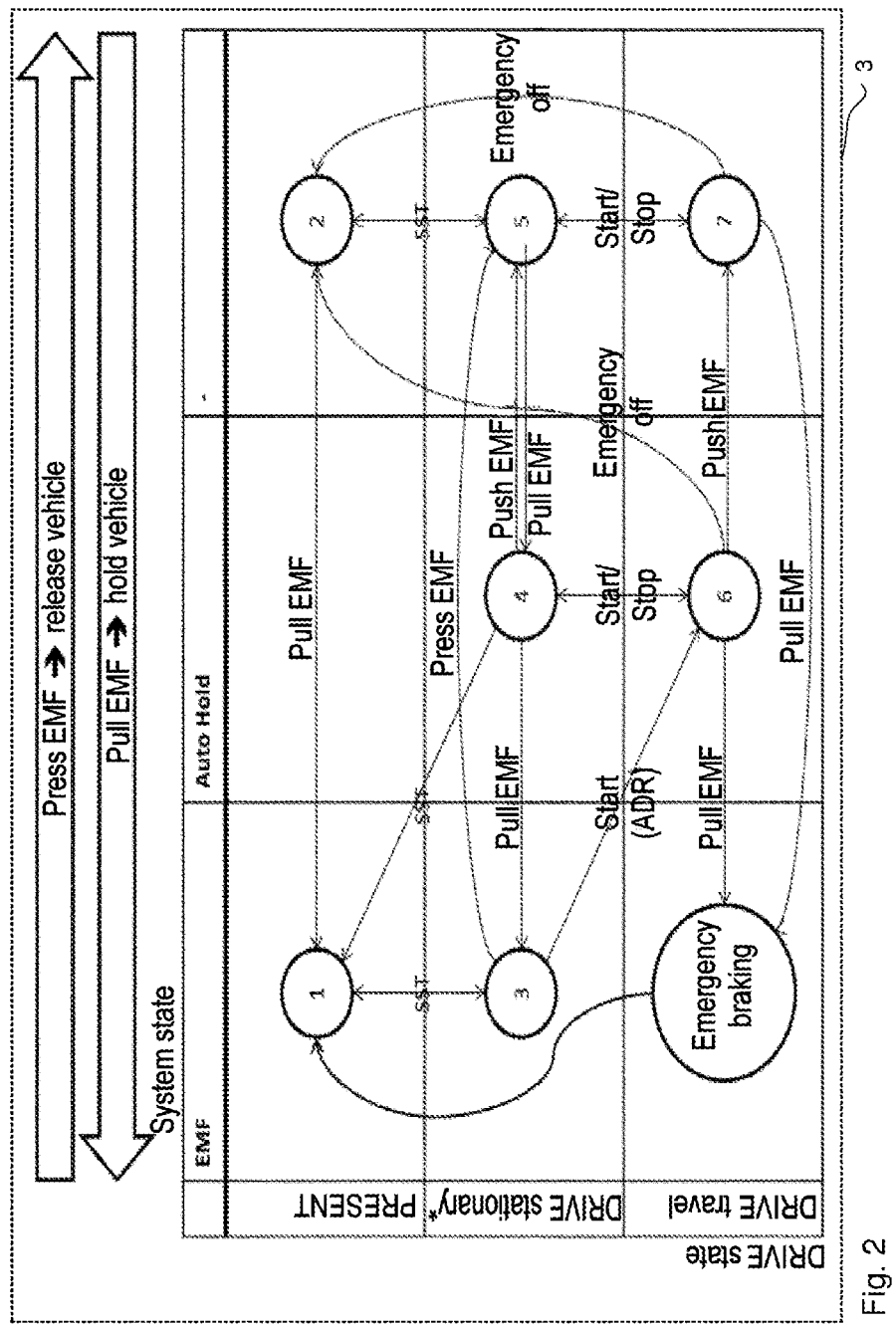
FIG. 2 shows a possible state transition diagram according to the method according to the invention in a possible variant.

In this context, in FIG. 2 the system state "auto-hold function activated" is abbreviated to "auto hold", and the system state "parking brake function switched on" is abbreviated to "EMF". The term "present" is understood to mean a vehicle state in which the driver is present in the vehicle but has not yet started the drive engine. The term "DRIVE stationary" is understood to mean a vehicle state in which the vehicle is still present in the stationary state but the drive engine has already started. The term "DRIVE travel" is understood to mean a vehicle state in which the vehicle is no longer present in the stationary state (v>0).

"Press EMF" corresponds to the actuation of the operator control element 4 in order to switch off "0" the parking brake function. "Pull EMF" corresponds to the actuation of the operator control element 4 in order to switch on "1" the parking brake function. The abbreviation "SST" indicates the starting or stopping of the drive engine.

Finally, on the following pages the state transitions are compiled in a table:

| Initial state | System state | Vehicle state | Control operation | Action | Target state |
|---|---|---|---|---|---|
| 1 | EMF | PRESENT | Press SST* | Setup DRIVE | 3 |
| 2 | — | PRESENT | Press SST* | Setup DRIVE | 5 |
|  |  |  | Pull EMF | Pull EMF | 1 |
| 3 | EMF | DRIVE stationary | Press SST | End DRIVE | 1 |
|  |  |  | Press EMF* | Release EMF | 5 |

-continued

| Initial state | System state | Vehicle state | Control operation | Action | Target state |
|---|---|---|---|---|---|
| | | | Start | Release EMF Activate Auto-H | 6 |
| 4 | Auto-H | DRIVE stationary | Press SST | End DRIVE, pull EMF | 1 |
| | | | Press EMF* | Deactivate Auto-H | 5 |
| | | | Pull EMF | Pull EMF | 3 |
| | | | Start | — | 6 |
| 5 | — | DRIVE stationary | Press SST | End DRIVE | 2 |
| | | | Pull EMF | Activate Auto-H | 4 |
| | | | Start | — | 7 |
| 6 | Auto-H | DRIVE travel | SST 5x | Engine emergency off | 2 |
| | | | Pull EMF | Emergency braking | 1 |
| | | | Press EMF | Deactivate Auto-H | 7 |
| | | | Stop | — | 4 |
| 7 | — | DRIVE travel | SST 5x | Engine emergency off | 2 |
| | | | Pull EMF | Emergency braking | 1 |
| | | | Stop | — | 5 |

*and press brake pedal BP

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. An electronic control unit, comprising:
   a function module that controls an auto-hold function and a parking brake function in a motor vehicle, wherein
   the function module is configured so as to receive, as an input signal, an electrical signal of an operator control element for switching the parking brake function on and off, wherein:
   when the parking brake function is switched on in a stationary state of the motor vehicle via the input signal from the operator control element, the auto-hold function is activatable simultaneously, and
   when an accelerator pedal is actuated, the switched-on parking brake function is switchable off automatically without actuating the operator control element while at the same time the auto-hold function remains activated or is activated.

2. The electronic control unit as claimed in claim 1, wherein
   the function module is further configured such that, when the parking brake function is switched off in the stationary state, the auto-hold function is also deactivatable by actuating the operator control element.

3. The electronic control unit as claimed in claim 1, wherein
   the function module is further configured such that, when the parking brake function is switched off in the stationary state by actuating the operator control element:
   (i) in the case of single actuation of the operator control element, the parking brake function is switched off and at the same time also the auto-hold function is deactivated, or
   (ii) when the operator control element is actuated for the first time, firstly the parking brake function is switched off, and when the operator control element is actuated again the auto-hold function is also deactivated.

4. The electronic control unit as claimed in claim 1, wherein
   the function module is further configured such that, when the parking brake function is switched on in the stationary state by actuating the operator control element:
   (i) in the case of single actuation of the operator control element, the parking brake function is switched on and at the same time also the auto-hold function is activated, or
   (ii) when the operator control element is actuated for the first time, firstly the parking brake function is switched on, and when the operator control element is actuated again the auto-hold function is also deactivated.

5. The electronic control unit as claimed in claim 1, wherein
   the function module is further configured such that, when the operator control element is actuated during travel in a way which causes the parking brake function to be switched on in the stationary state:
   (i) the auto-hold function is activatable if the actuation of the operator control element is performed in a defined, comparatively short time or if no emergency braking function is connected to the actuation of the operator control element during travel, or
   (ii) the auto-hold function cannot be activated if an emergency braking function is connected to the actuation of the operator control element during travel, or
   (iii) the auto-hold function can be activated if the actuation of the operator control element is performed in a defined, comparatively short time and that after the expiry of this time further actuation of the operator control element causes an emergency braking function.

6. A system capable to perform an auto-hold function of a motor vehicle, comprising:
   an electronic control unit as claimed in claim 1; and
   an operator control element by which the auto-hold function is activatable and deactivatable in order to switch a parking brake function on and off, wherein
   the operator control element continues to be used at a same time for switching the parking brake function on and off.

7. A motor vehicle, comprising: a system capable to perform an auto-hold function of a motor vehicle as claimed in claim 6.

8. A method for controlling an auto-hold function and a parking brake function of a motor vehicle, the method comprising the step of:
   providing a single common operator control element by which the auto-hold and parking brake functions are controllable; and
   when the single common operator control element is actuated for the first time or after it has been actuated multiple times in order to switch on the parking brake function in a stationary state, the auto-hold function is also activated, and when an accelerator pedal is actuated, the switched-on parking brake function is switchable off automatically without actuating the single common operator control element while at the same time the auto-hold function remains activated or is activated.

9. A method for controlling an auto-hold function and a parking brake function of a motor vehicle via a single common operator control element, the method comprising the steps of:

when the parking brake function is switched on in a stationary state by actuating the single common operator control element;
  (i) in the case of single actuation of the single common operator control element, the parking brake function is switched on and at the same time also the auto-hold function is activated, or
  (ii) when the single common operator control element is actuated for the first time, firstly the parking brake function is switched on, and when the single common operator control element is actuated again the auto-hold function is also activated, when an accelerator pedal is actuated, the switched-on parking brake function is switchable off automatically without actuating the single common operator control element while at the same time the auto-hold function remains activated or is activated.

10. A method for controlling an auto-hold function and a parking brake function of a motor vehicle via a single common operator control element, the method comprising the steps of:

when the parking brake function is switched off in a stationary state by actuating the single common operator control element;
  (i) in the case of single actuation of the single common operator control element, the parking brake function is switched off and at the same time the auto-hold function is also deactivated, or
  (ii) when the single common operator control function is actuated for the first time, firstly the parking brake function is switched off, and when the single common operator control element is actuated again the auto-hold function is also deactivated, and when an accelerator pedal is actuated, a switched-on parking brake function is switchable off automatically without actuating the single common operator control element while at the same time the auto-hold function remains activated or is activated.

11. The method as claimed in claim 10, wherein
when the parking brake function is switched off in a stationary state by actuating the single common operator control element, the auto-hold function is also deactivated.

12. The method as claimed in claim 11, wherein
when the operator control element is actuated during travel in a way which causes the parking brake to be switched on in the stationary state:
  (i) the auto-hold function is activated if the actuation of the operator control element is performed in a defined, comparatively short time or if no emergency braking function is connected to the actuation of the operator control element during travel, or
  (ii) the auto-hold function is not activated if an emergency braking function is connected to the actuation of the operator control element during travel, or
  (iii) the auto-hold function is activated if the actuation of the operator control element is performed in a defined, comparatively short time and that after the expiry of this time further actuation of the operator control element causes an emergency braking function.

* * * * *